(12) United States Patent
Han et al.

(10) Patent No.: US 12,207,765 B2
(45) Date of Patent: Jan. 28, 2025

(54) MIXING APPARATUS, MIXING MACHINE AND COOKING UTENSIL

(71) Applicant: IB APPLIANCES US HOLDINGS LLC, Downers Grove, IL (US)

(72) Inventors: Yude Han, Zhejiang (CN); Yi Qin, Ottawa (CA); Jiwei Wang, Ottawa (CA)

(73) Assignee: IB APPLIANCES US HOLDINGS, LLC, Chicago, IL (US)

( * ) Notice: Subject to any disclaimer, the term of this patent is extended or adjusted under 35 U.S.C. 154(b) by 804 days.

(21) Appl. No.: 17/335,978

(22) Filed: Jun. 1, 2021

(65) Prior Publication Data

US 2021/0378450 A1 Dec. 9, 2021

(30) Foreign Application Priority Data

Jun. 9, 2020 (CN) .......................... 202021049408.5

(51) Int. Cl.
*A47J 43/07* (2006.01)
*A47J 27/08* (2006.01)
(Continued)

(52) U.S. Cl.
CPC ....... *A47J 43/0711* (2013.01); *A47J 27/0817* (2013.01); *A47J 43/044* (2013.01); *A47J 43/082* (2013.01); *B01F 27/0541* (2022.01); *B01F 27/1124* (2022.01); *B01F 27/90* (2022.01); *B01F 35/3204* (2022.01);
(Continued)

(58) Field of Classification Search
CPC .. B01F 27/0541; B01F 27/1124; B01F 27/90; B01F 35/3204; B01F 35/411; B01F 35/45; B01F 35/3214; B01F 2101/1805; B01F 27/96; B01F 33/86; A47J 43/0711;
(Continued)

(56) References Cited

U.S. PATENT DOCUMENTS 4,065,811 A 12/1977 Pauty
4,321,860 A * 3/1982 Hazen .................. A01J 25/001
99/453

(Continued)

FOREIGN PATENT DOCUMENTS

CN 1080158 A 1/1994
CN 1160339 A 9/1997
(Continued)

OTHER PUBLICATIONS

U.S. Appl. No. 17/335,872, filed Jun. 1, 2021, Han et al.
(Continued)

*Primary Examiner* — Elizabeth M Kerr
(74) *Attorney, Agent, or Firm* — Crowell & Moring LLP

(57) ABSTRACT

Disclosed in an embodiment of the present application is a mixing apparatus, mixing machine, and cooking utensil. A mixing apparatus that can be fitted to an electric motor assembly. The electric motor assembly is able to drive the mixing apparatus to rotate for mixing food ingredients. The mixing apparatus comprises a connection part, stirring rods extended from the connection part and stirring bars. The positions at which the stirring bars are fitted to the stirring rods can be adjusted based on the type and quantity of food ingredients to increase mixing uniformity.

13 Claims, 4 Drawing Sheets

(51) Int. Cl.
  *A47J 43/044*  (2006.01)
  *A47J 43/08*   (2006.01)
  *B01F 27/054*  (2022.01)
  *B01F 27/1124* (2022.01)
  *B01F 27/90*   (2022.01)
  *B01F 35/32*   (2022.01)
  *B01F 35/41*   (2022.01)
  *B01F 35/45*   (2022.01)
  *B01F 101/00*  (2022.01)

(52) U.S. Cl.
  CPC ............ B01F 35/411 (2022.01); B01F 35/45 (2022.01); *A47J 2043/0449* (2013.01); *B01F 35/3214* (2022.01); *B01F 2101/1805* (2022.01)

(58) Field of Classification Search
  CPC .... A47J 27/0817; A47J 43/044; A47J 43/082; A47J 2043/0449; A47J 37/0641
  See application file for complete search history.

(56) References Cited

U.S. PATENT DOCUMENTS

| | | | |
|---|---|---|---|
| 4,339,992 A * | 7/1982 | Kurland | B01F 27/1125 366/342 |
| 5,297,867 A * | 3/1994 | Holman | B01F 27/1125 366/279 |
| 5,372,422 A | 12/1994 | Dubroy | |
| 5,533,801 A | 7/1996 | Safont et al. | |
| 5,547,279 A | 8/1996 | Spitzer Sr. | |
| 5,615,951 A * | 4/1997 | Gabriele | B01F 27/192 99/348 |
| 5,816,136 A | 10/1998 | Stallings | |
| 5,938,325 A | 8/1999 | Edwards | |
| 6,629,491 B1 | 10/2003 | Chan | |
| 9,138,103 B1 | 9/2015 | Cados | |
| 9,687,103 B2 | 6/2017 | Conti et al. | |
| 9,693,649 B2 | 7/2017 | Conti et al. | |
| 10,427,116 B2 | 10/2019 | Altenritter et al. | |
| 2003/0193835 A1 | 10/2003 | Richardson | |
| 2008/0223810 A1 | 9/2008 | Garcia | |
| 2008/0257168 A1 | 10/2008 | Wolfe | |
| 2010/0165785 A1 * | 7/2010 | Kaas | B01F 27/118 366/325.6 |
| 2012/0189745 A1 | 7/2012 | DeLong | |
| 2012/0257471 A1 * | 10/2012 | Unteregger | B01F 27/95 366/288 |
| 2021/0315216 A1 * | 10/2021 | Buck | A21B 7/005 |

FOREIGN PATENT DOCUMENTS

| | | |
|---|---|---|
| CN | 1751635 A | 3/2006 |
| CN | 201316179 Y | 9/2009 |
| CN | 201551179 U | 8/2010 |
| CN | 201861482 U | 6/2011 |
| CN | 102151094 A | 8/2011 |
| CN | 201968506 U | 9/2011 |
| CN | 202397249 U | 8/2012 |
| CN | 202426351 U | 9/2012 |
| CN | 103006086 A | 4/2013 |
| CN | 102151068 B | 5/2013 |
| CN | 103222810 A | 7/2013 |
| CN | 102551504 B | 7/2014 |
| CN | 204133150 U | 2/2015 |
| CN | 204232841 U | 4/2015 |
| CN | 204232842 U | 4/2015 |
| CN | 204232843 U | 4/2015 |
| CN | 204232943 U | 4/2015 |
| CN | 204318383 U | 5/2015 |
| CN | 204336688 U | 5/2015 |
| CN | 204378845 U | 6/2015 |
| CN | 204378846 U | 6/2015 |
| CN | 204580867 U | 8/2015 |
| CN | 204580980 U | 8/2015 |
| CN | 204813466 U | 12/2015 |
| CN | 105581630 A | 5/2016 |
| CN | 105640297 A | 6/2016 |
| CN | 105662119 A | 6/2016 |
| CN | 105686620 A | 6/2016 |
| CN | 205338585 U | 6/2016 |
| CN | 102334908 B | 9/2016 |
| CN | 105935261 A | 9/2016 |
| CN | 103648344 B | 11/2016 |
| CN | 106731999 A | 5/2017 |
| CN | 206137870 U | 5/2017 |
| CN | 206137942 U | 5/2017 |
| CN | 206182997 U | 5/2017 |
| CN | 206197735 U | 5/2017 |
| CN | 206197736 U | 5/2017 |
| CN | 206197737 U | 5/2017 |
| CN | 106901587 A | 6/2017 |
| CN | 206213124 U | 6/2017 |
| CN | 206239177 U | 6/2017 |
| CN | 107242769 A | 10/2017 |
| CN | 107242803 A | 10/2017 |
| CN | 206560359 U | 10/2017 |
| CN | 206586800 U | 10/2017 |
| CN | 107361621 A | 11/2017 |
| CN | 107361622 A | 11/2017 |
| CN | 107361623 A | 11/2017 |
| CN | 206641761 U | 11/2017 |
| CN | 105581631 B | 12/2017 |
| CN | 103767570 B | 1/2018 |
| CN | 107616676 A | 1/2018 |
| CN | 107773019 A | 3/2018 |
| CN | 207071018 U | 3/2018 |
| CN | 207125647 U | 3/2018 |
| CN | 207323275 U | 5/2018 |
| CN | 207492549 U | 6/2018 |
| CN | 207492550 U | 6/2018 |
| CN | 207492551 U | 6/2018 |
| CN | 207492552 U | 6/2018 |
| CN | 207492553 U | 6/2018 |
| CN | 105640295 B | 7/2018 |
| CN | 207590472 U | 7/2018 |
| CN | 207590473 U | 7/2018 |
| CN | 207590475 U | 7/2018 |
| CN | 207590476 U | 7/2018 |
| CN | 207590477 U | 7/2018 |
| CN | 207590478 U | 7/2018 |
| CN | 207590528 U | 7/2018 |
| CN | 207627014 U | 7/2018 |
| CN | 207755173 U | 8/2018 |
| CN | 207768204 U | 8/2018 |
| CN | 105640294 B | 9/2018 |
| CN | 108606622 A | 10/2018 |
| CN | 108618574 A | 10/2018 |
| CN | 108670015 A | 10/2018 |
| CN | 208114512 U | 11/2018 |
| CN | 208274488 U | 12/2018 |
| CN | 208286832 U | 12/2018 |
| CN | 208286837 U | 12/2018 |
| CN | 208286838 U | 12/2018 |
| CN | 208286839 U | 12/2018 |
| CN | 208286840 U | 12/2018 |
| CN | 208286882 U | 12/2018 |
| CN | 208286891 U | 12/2018 |
| CN | 105640296 B | 1/2019 |
| CN | 109247803 A | 1/2019 |
| CN | 109247840 A | 1/2019 |
| CN | 109247842 A | 1/2019 |
| CN | 208301462 U | 1/2019 |
| CN | 208371517 U | 1/2019 |
| CN | 208435231 U | 1/2019 |
| CN | 208435327 U | 1/2019 |
| CN | 208435342 U | 1/2019 |
| CN | 208463593 U | 2/2019 |
| CN | 109419368 A | 3/2019 |
| CN | 208551083 U | 3/2019 |
| CN | 208551371 U | 3/2019 |
| CN | 208582197 U | 3/2019 |
| CN | 208590899 U | 3/2019 |
| CN | 208640356 U | 3/2019 |

(56) References Cited

FOREIGN PATENT DOCUMENTS

| | | | |
|---|---|---|---|
| CN | 208692904 U | 4/2019 |
| CN | 208692940 U | 4/2019 |
| CN | 208692941 U | 4/2019 |
| CN | 208692942 U | 4/2019 |
| CN | 208692943 U | 4/2019 |
| CN | 208693024 U | 4/2019 |
| CN | 208693025 U | 4/2019 |
| CN | 208693027 U | 4/2019 |
| CN | 208709336 U | 4/2019 |
| CN | 208709337 U | 4/2019 |
| CN | 208709338 U | 4/2019 |
| CN | 208709339 U | 4/2019 |
| CN | 208709538 U | 4/2019 |
| CN | 208709539 U | 4/2019 |
| CN | 208725475 U | 4/2019 |
| CN | 208725515 U | 4/2019 |
| CN | 208740650 U | 4/2019 |
| CN | 208808128 U | 5/2019 |
| CN | 209031893 U | 6/2019 |
| CN | 209047874 U | 7/2019 |
| CN | 209047929 U | 7/2019 |
| CN | 209060967 U | 7/2019 |
| CN | 209074131 U | 7/2019 |
| CN | 209074132 U | 7/2019 |
| CN | 209074241 U | 7/2019 |
| CN | 209106931 U | 7/2019 |
| CN | 209106932 U | 7/2019 |
| CN | 209121878 U | 7/2019 |
| CN | 110115495 A | 8/2019 |
| CN | 110115509 A | 8/2019 |
| CN | 209202774 U | 8/2019 |
| CN | 106963229 B | 9/2019 |
| CN | 209377296 U | 9/2019 |
| CN | 209377297 U | 9/2019 |
| CN | 209377303 U | 9/2019 |
| CN | 209391661 U | 9/2019 |
| CN | 209436890 U | 9/2019 |
| CN | 209436893 U | 9/2019 |
| CN | 110353472 A | 10/2019 |
| CN | 209474414 U | 10/2019 |
| CN | 209678165 U | 11/2019 |
| CN | 106388619 B | 12/2019 |
| CN | 210018910 U | 2/2020 |
| CN | 210095498 U | 2/2020 |
| CN | 110870678 A | 3/2020 |
| DE | 861913 C | 1/1953 |
| EP | 2903486 B1 | 6/2019 |
| KR | 100503442 B1 | 7/2005 |
| KR | 2015-0052545 A | 5/2015 |
| KR | 2019-0130253 A | 11/2019 |
| KR | 2020-0022895 A | 3/2020 |
| WO | WO 2020/022640 A1 | 1/2020 |
| WO | WO 2020/099693 A1 | 5/2020 |

OTHER PUBLICATIONS

U.S. Appl. No. 17/335,965, filed Jun. 1, 2021, Han et al.
Extended European Search Report for Application No. EP 21178231.3 dated Oct. 14, 2021, 8 pages.
Extended European Search Report for Application No. EP 21178246.1 dated Oct. 15, 2021, 10 pages.
Extended European Search Report for Application No. EP 21178276.8 dated Oct. 27, 2021, 9 pages.

\* cited by examiner

MIXING APPARATUS, MIXING MACHINE AND COOKING UTENSIL

RELATED APPLICATION

The present application claims priority to Chinese Patent Application Number CN2020210494085, filed Jun. 9, 2020, the entirety of which is hereby incorporated by reference.

FIELD

The present utility model relates to the field of small household electrical appliances and, more particularly, to a mixing apparatus, mixing machine and cooking utensil.

BACKGROUND

Automatic frying machines are smart cooking appliances that achieve automatic cooking. In comparison with the conventional cooking pot, automatic frying machines have the functions of automatic oil heating, automatic frying and automatic heat control, and are widely popular. An automatic frying machine includes a pot body and a pot lid assembly. The pot lid assembly includes a pot lid, an electric motor fitted to the pot lid, and a stirrer assembly connected to the electric motor. The electric motor causes the stirrer assembly to rotate in order to fry the food ingredients in the pot body. However, as the stirring rods have a relatively short lateral width, only viscous food ingredients can be stirred and other food ingredients would result in uneven stirring.

SUMMARY OF THE DESCRIPTION

The present application provides a mixing apparatus, mixing machine, and cooking utensil capable of mixing uniformly.

The present application provides a mixing apparatus that can be fitted to an electric motor assembly, the electric motor assembly being able to drive the mixing apparatus to rotate for mixing food ingredients. The mixing apparatus comprises a connection part, stirring rods extended from the connection part and stirring bars. The positions at which the stirring bars are fitted to the stirring rods can be adjusted based on the type and quantity of food ingredients.

Further, the stirring rods and the stirring bars are crossedly arranged.

Further, the mixing apparatus includes a plurality of stirring rods, and the stirring bars are fitted to at least two of the stirring rods.

Further, the mixing apparatus includes at least two of the stirring bars.

Further, each of the stirring rods includes a connection part extended horizontally from the connection part and a stirring part extended downward from the connection part, and the stirring bars are fitted to the stirring parts.

Further, each of the stirring parts is provided with a plurality of positioning pieces, the positioning pieces protruding towards one side thereof to position the stirring bars relative to the stirring rods.

Further, the stirring bars and the stirring parts are detachable. The stirring bars are provided with a plurality of assembly holes for the stirring parts to pass through. The stirring bars are elastically deformable to allow the positioning pieces to pass through the assembly holes.

Further, each of the stirring bars includes a first assembled part and a second assembled part extended downward from the first assembled part, with the second assembled part gradually thinning from the first assembled part.

An embodiment of the present application further provides a mixing machine comprising an electric motor assembly and the mixing apparatus as defined above, the electric motor assembly being able to drive the mixing apparatus to rotate.

An embodiment of the present application further provides a cooking utensil comprising a pot body, a pot lid covering the pot body, and a mixing machine as defined above.

The mixing apparatus of the present application is provided with stirring bars fitted to the stirring rods. The positions at which the stirring bars are fitted to the stirring rods can be adjusted based on the type and quantity of food ingredients to increase mixing uniformity.

DETAILED DESCRIPTION

Here the exemplary embodiments will be described in detail with reference to the accompanying drawings. Unless otherwise stated in the description of the accompanying drawings, it is to be noted that same numerals represent the same or similar elements. The exemplary embodiments described below do not represent all embodiments consistent with the present application. On the contrary, they are merely examples of devices consistent with some aspects of the present application described in detail in the appended claims.

The terms used in the present application are merely intended to describe specific embodiments instead of limiting the present application. Unless otherwise defined, the technical or scientific terms used in the present application shall have ordinary meanings commonly understood by persons of ordinary skills in the art. The terms "first", "second" and the like used in the description and claims of the present application do NOT indicate any sequence, quantity or importance, but are intended to identity different constituent parts. Similarly, words such as "one" or "a" also do NOT indicate quantity limits, but indicates the presence of at least one. "A plurality of" or "several" indicate two or more. Unless otherwise indicated, the terms "front section", "rear section", "lower section" and/or "upper section" and the like are merely intended for facilitating illustration, instead of limiting to a location or spatial orientation. The terms "comprises" or "includes" and the like are intended to refer to the components or items appearing before the words "comprises" or "includes", including the components or items appearing after the words "comprises" or "includes" and their equivalence, and do NOT exclude other components or items. The terms "connect" or "link" and the like are not limited to physical or mechanical connections, and may include electrical connections, be they direct or indirect. Unless otherwise clearly defined by context, the singular forms "a", "the" and "that" used in the description and claims of the present application are intended to include the plurals. It must also be understood that the words "and/or" used herein refer to and include any and all possible combinations of one or a plural number of associated listed items.

Figure 1:
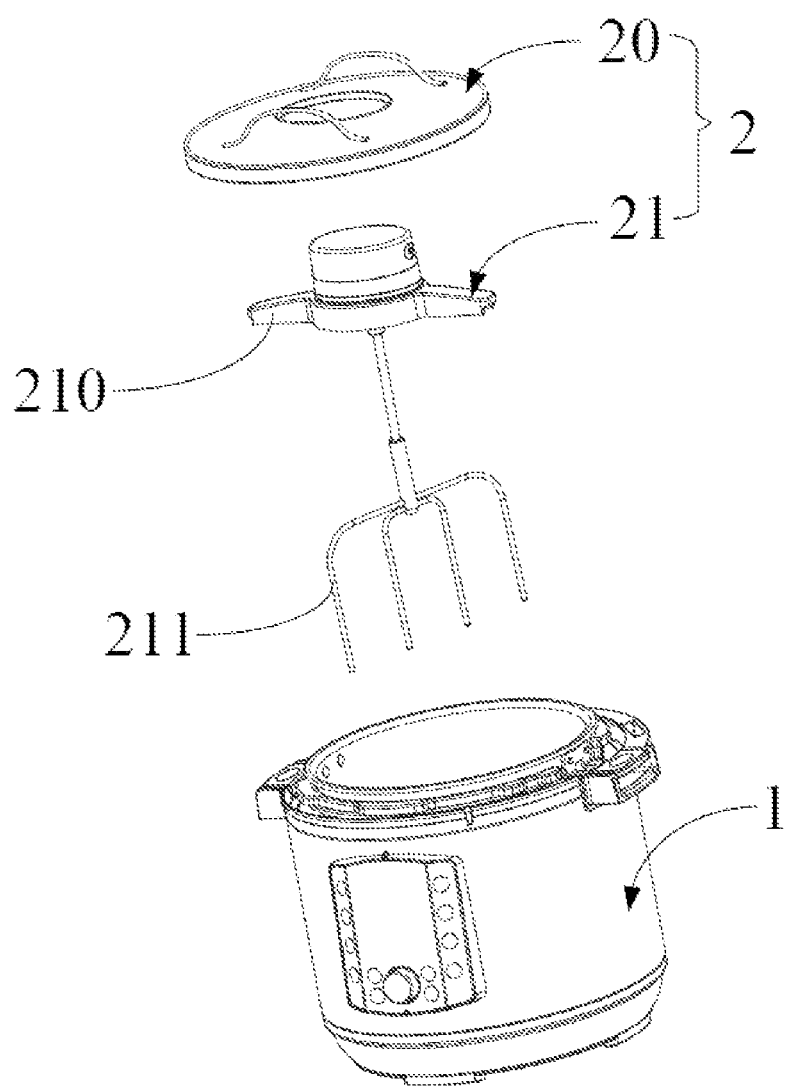
FIG. 1 is an exploded view of a cooking utensil of the present application.
Figure 2:
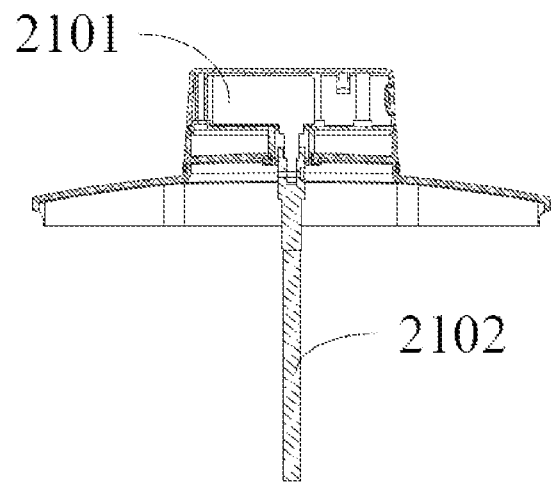
FIG. 2 is a schematic sectional view of the electric motor assembly shown in FIG. 1.

As shown in FIGS. 1 and 2, an electric pressure cooker of the present application comprises a pot body 1 and a pot lid assembly 2. The pot body 1 includes a cooking space into which food ingredients are placed for cooking. The pot lid assembly 2 includes a pot lid 20 and a mixing machine 21. The mixing machine 21 includes an electric motor assembly 210 and a mixing apparatus 211. The electric motor assembly 210 includes an electric motor 2101 and a rotary shaft 2102 connected to the electric motor 2101, with the mixing apparatus 211 fitted to the rotary shaft 2102. When in operation, the electric motor 2101 causes rotation of the rotary shaft 2102 which in turn causes the mixing apparatus 211 to rotate for mixing food ingredients.

The pot lid 20 may be fixed to the electric motor assembly 210, in which case the mixing machine 21 is taken from the cooking space of the pot body 1 once the pot lid 20 is removed. The pot lid 20 may also not be fixed to the electric motor assembly 210, in which case the mixing machine 21 remains in the cooking space of the pot body 1 when the pot lid 20 is removed, and this facilitates addition of ingredients partway through the cooking process. The electric motor assembly 210 and the pot lid 20 are detachable from each other. The mixing apparatus 211 and the electric motor assembly 210 are also detachable from each other. This facilitates maintenance, part replacement, and cleaning of the mixing apparatus 211.

Figure 3:
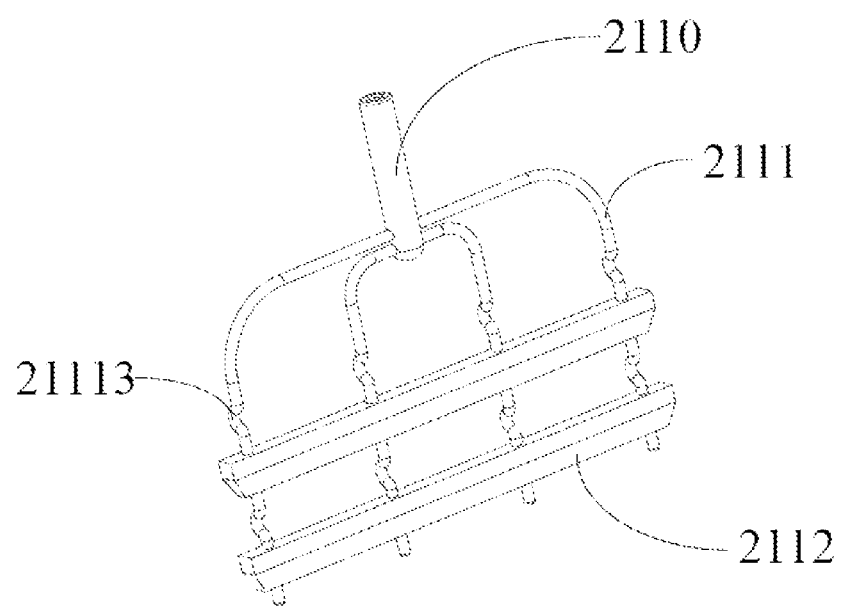
FIG. 3 is an isometric view of the mixing apparatus shown in FIG. 1.
Figure 4:
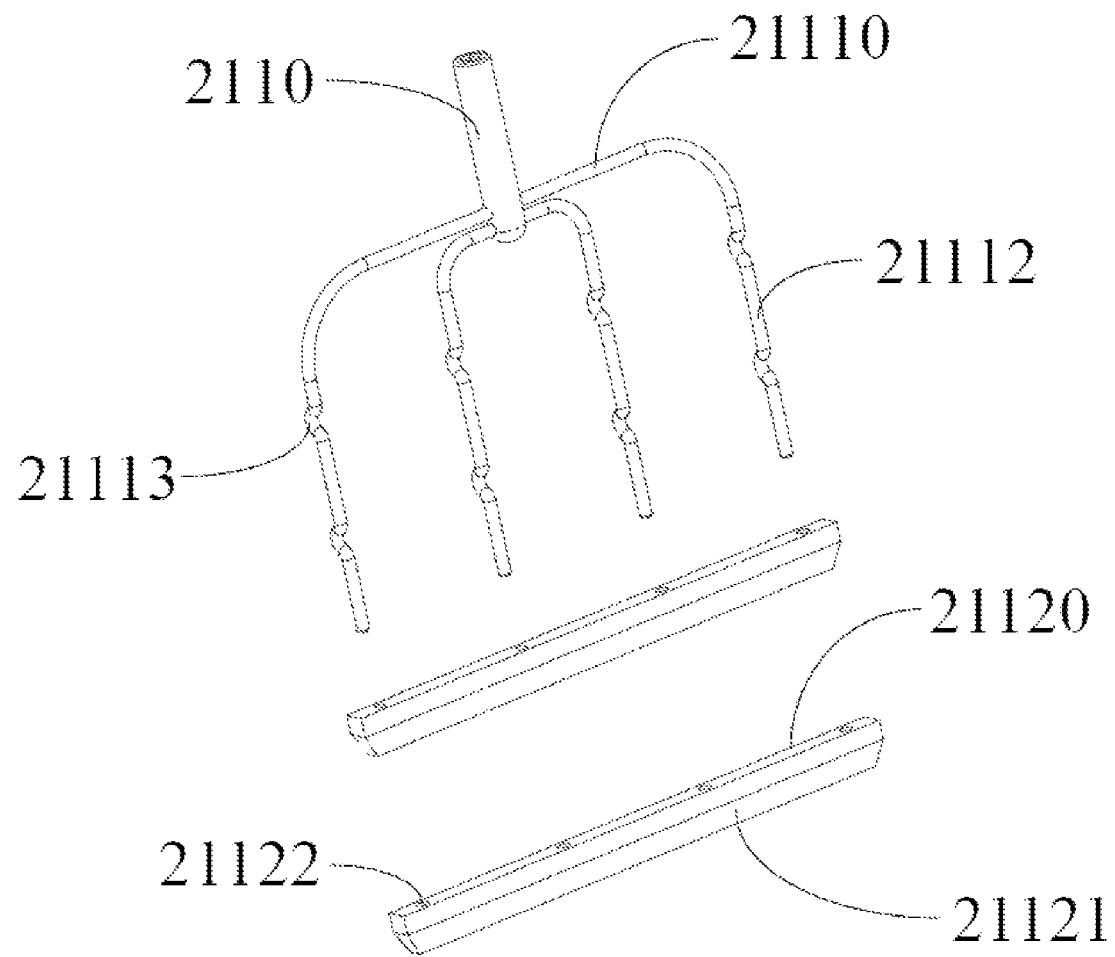
FIG. 4 is an exploded view of the mixing apparatus shown in FIG. 3.

As shown in FIGS. 3 and 4, the mixing apparatus 211 comprises a connection part 2110, a plurality of stirring rods 2111 extended from the connection part 2110 and stirring bars 2112 fitted to the stirring rods 2111. The stirring bars 2112 and the stirring rods 2111 are perpendicular to one another, or crossedly arranged. In the embodiment shown in the figures, the stirring rods 2111 are extended vertically while the stirring bars 2112 are extended horizontally. The stirring bars 2112 may also be arranged at an inclination relative to the stirring rods 2111. The stirring bars 2112 may move relative to the stirring rods 2111 for position adjustment and for the stirring bars 2112 and the stirring rods 2111 to be detachable, so that the quantity of the stirring bars 2112 and the positions for their fitting to the stirring rods 2111 can be adjusted based on the type and quantity of the food ingredients to increase mixing uniformity. The stirring bars 2112 and the stirring parts 21112 are detachable from each other. When stirring viscous food ingredients, the stirring bars 2112 may be removed. The quantity of the stirring bars 2112 and the positions at which the stirring bars 2112 are fitted to the stirring rods 2111 can be adjusted based on actual needs. In addition, the detachability facilitates cleaning of the stirring bars 2112 and the stirring rods 2111.

The stirring rods 2111 are cylindrical. The connection part 2110 is fitted to the rotary shaft 2102 of the electric motor assembly 210. Each of the stirring rods 2111 includes a connection part 21110 extended horizontally from the connection part 2110 and a stirring part 21112 extended downward from the connection part 21110. Each of the stirring parts 21112 is provided with a plurality of positioning pieces 21113. The positioning pieces 21113 protrude towards one side thereof to position the stirring bars 2112 to the stirring rods 2111. When a plurality of positioning pieces 21113 are provided, a plurality of stirring bars 2112 may be fitted so that the quantity of stirring bars 2112 can be selectively adjusted based on the amount of food ingredients. The stirring bars 2112 are located between two positioning pieces 21113 to prevent upward and downward movements of the stirring bars 2112, so that desirable positioning effects are achieved. It may be chosen that no positioning pieces 21113 be provided to the stirring parts 21112, in which case the stirring bars 2112 are positioned relative to the stirring parts 21112 through the tight fitting between the stirring parts 21112 and the stirring bars 2112.

The stirring bars 2112 may be fitted to one stirring rod 2111 or a plurality of stirring rods 2111. When fitted to a plurality of stirring rods 2111, the stability of the stirring bars 2112 is increased and that helps to prevent the stirring bars 2112 from rotating about a stirring rod 2111 after being subjected to force. Furthermore, that also prevents both ends of the stirring bars 2112 from swinging after being subjected to force. The stirring bars 2112 have a width greater than that of the stirring rods 2111. Preferably, the stirring bars 2112 have a width greater than the distance between two adjacent stirring rods 2111 so as to prevent some food ingredients from escaping from the gaps between multiple stirring rods 2111 and thereby increase mixing uniformity. Each of the stirring bars 2112 includes a first assembled part 21120 and a second assembled part 21121 extended downward from the first assembled part 21120. The second assembled part 21121 gradually thins from the first assembled part 21120 and since the second assembled part 21121 is more elastic, it prevents the food ingredients from being damaged by the stirring bars 2112.

Each of the stirring bars 2112 is provided with one or a plurality of assembly holes 21122. The stirring bars 2112 are inserted into the assembly holes 21122. The stirring bars 2112 are elastically deformable to allow the positioning pieces 21113 to pass through the assembly holes 21122, thereby facilitating assembly. The stirring bars 2112 are perpendicular to the stirring rods 2111 so that the stirring bars 2112 can effectively stir the food ingredients.

Figure 5:
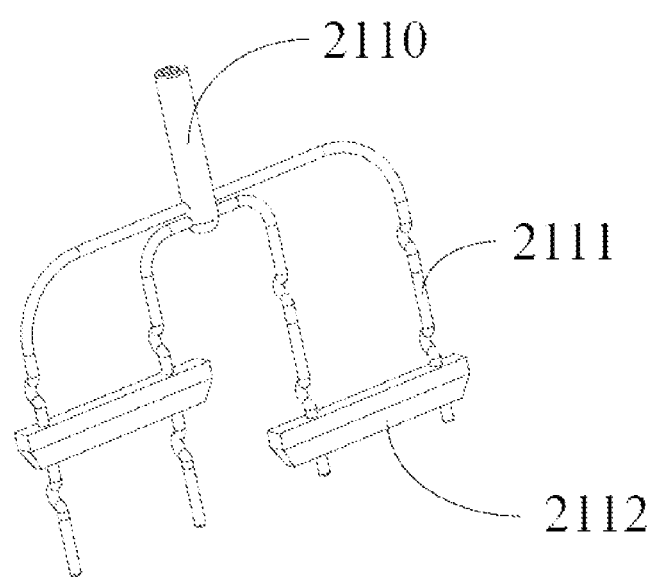
FIG. 5 is an isometric view of a mixing apparatus of another embodiment of the present application.

One or a plurality of stirring bars 2112 may be arranged, and the positions at which they are fitted to the stirring rods 2111 can be adjusted based on the actual needs. As shown in FIG. 3, the stirring bars 2112 are fitted to all the stirring rods 2111. In another embodiment as shown in FIG. 5, each of the stirring bars 2112 is fitted to two of the stirring rods 2111. In the embodiments of the present application, the quantity and fitting positions of the mixing apparatus 211 and the quantity of stirring rods 2111 fitted are not limited.

In an embodiment of the present application, the mixing apparatus 211 is provided with stirring bars 2112 fitted to the stirring rods 2111, and the positions at which the stirring bars 2112 are fitted to the stirring rods 2111 can be adjusted based on the type and quantity of food ingredients to increase mixing uniformity.

The foregoing merely describes preferred embodiments of the present application, instead of limiting it in any way. While preferred embodiments of the present application have been disclosed above, they are not intended to limit the present application. Any persons skilled in the art may contemplate equivalent embodiments by making some alteration or modification to the disclosure without departing from the scope of the present application. However, any alteration, equivalent change and modification made without departing from the spirit of the present application shall fall within the scope of protection thereof.

The invention claimed is:

1. A mixing apparatus that can be fitted to an electric motor assembly, the electric motor assembly being able to drive the mixing apparatus to rotate for mixing food ingredients, the mixing apparatus comprising:
a first connection part;
a plurality of stirring rods extending from the first connection part; and,
a stirring bar;
wherein the stirring bar is fitted to at least two stirring rods of the plurality of stirring rods, and
wherein positions at which the stirring bar is fitted to the at least two stirring rods of the plurality of stirring rods are selectively adjustable based on a type and quantity of food ingredients to be mixed,
wherein the stirring bar includes a first assembled part and a second assembled part extended downward from the first assembled part, with the second assembled part gradually thinning from the first assembled part, and
wherein when the stirring bar is fitted to at least two stirring rods of the plurality of stirring rods, the at least two stirring rods of the plurality of stirring rods extend through both the first assembled part and the second assembled part of the stirring bar.

2. The mixing apparatus of claim 1, wherein the plurality of stirring rods and the stirring bar are crossedly arranged.

3. The mixing apparatus of claim 1, wherein the mixing apparatus includes at least two stirring bars.

4. The mixing apparatus of claim 1, wherein each stirring rod of the plurality of stirring rods includes a second connection part extended horizontally from the first connection part, a stirring part extended downward from the second connection part, and the stirring bar is fitted to the stirring part.

5. The mixing apparatus of claim 4, wherein the stirring part of each stirring rod of the plurality of stirring rods is provided with a plurality of positioning pieces, the positioning pieces protruding towards one side thereof to position the stirring bar relative to each stirring rod of the plurality of stirring rods.

6. The mixing apparatus of claim 5, wherein:
the stirring bar and the stirring part are detachable;
the stirring bar is provided with a plurality of assembly holes for the stirring part to pass through; and,
the stirring bar is elastically deformable to allow the plurality of positioning pieces to pass through the plurality of assembly holes.

7. A cooking utensil comprising:
a pot body;
a pot lid;
a mixing apparatus for mixing food ingredients placed in the pot body, the mixing apparatus comprising a first connection part, a plurality of stirring rods extending from the first connection part, and a stirring bar, wherein the stirring bar is fitted to at least two stirring rods of the plurality of stirring rods, and wherein positions at which the stirring bar is fitted to the at least two stirring rods of the plurality of stirring rods are selectively adjustable based on a type and quantity of food ingredients placed in the pot body; and,
a mixing machine having an electric motor assembly for driving the mixing apparatus,
wherein the stirring bar includes a first assembled part and a second assembled part extended downward from the first assembled part, with the second assembled part gradually thinning from the first assembled part, and
wherein when the stirring bar is fitted to at least two stirring rods of the plurality of stirring rods, the at least two stirring rods of the plurality of stirring rods extend through both the first assembled part and the second assembled part of the stirring bar.

8. The cooking utensil of claim 7, wherein the plurality of stirring rods and the stirring bar are crossedly arranged.

9. The cooking utensil of claim 7, wherein the mixing apparatus includes at least two stirring bars.

10. The cooking utensil of claim 7, wherein each stirring rod of the plurality of stirring rods includes a second connection part extended horizontally from the first connection part, a stirring part extended downward from the second connection part, and the stirring bar is fitted to the stirring part.

11. The cooking utensil of claim 10, wherein the stirring part of each stirring rod of the plurality of stirring rods is provided with a plurality of positioning pieces, the positioning pieces protruding towards one side thereof to position the stirring bar relative to each stirring rod of the plurality of stirring rods.

12. The cooking utensil of claim 11, wherein:
the stirring bar and the stirring part are detachable;
the stirring bar is provided with a plurality of assembly holes for the stirring part to pass through; and,
the stirring bar is elastically deformable to allow the plurality of positioning pieces to pass through the plurality of assembly holes.

13. The cooking utensil of claim 7, wherein the cooking utensil is a frying machine.

* * * * *